United States Patent Office 3,320,142
Patented May 16, 1967

1

3,320,142
PROCESS FOR PREPARING TRIFLUOROACETYL CHLORIDE
Otto Scherer, Bad Soden, Taunus, and Helmut Hahn, Frankfurt am Main, Germany, assignors to Farbwerke Hoechst Aktiengesellschaft vormals Meister Lucius & Bruning, Frankfurt am Main, Germany, a corporation of Germany
No Drawing. Filed Mar. 3, 1964, Ser. No. 349,153
Claims priority, application Germany, Mar. 7, 1963, F 39,186
2 Claims. (Cl. 204—158)

Various processes for preparing trifluoroacetyl chloride are known. For example, trifluoroacetyl chloride can be prepared from trifluoroacetic acid and phosphorus pentachloride (Journal of the American Chemical Society, 71, 752 (1949)), from trifluoroacetic acid, benzotrichloride and zinc chloride (Recueil des Travaux Chimiques des Pays Bas, 66, 425 (1947)) or from trifluoroacetic acid and benzoyl chloride (Journal of the American Chemical Society, 70, 1968 (1948), and U.S. Patent 2,257,868). Trifluoroacetyl chloride may also be prepared by heating the sodium salt of trifluoroacetic acid with phosphorus oxychloride or by reacting the barium salt of trifluoroacetic acid with phosphorus trichloride (Journal of the American Chemical Society, 71, 3440 (1949) or 65, 389 (1943)). The disadvantage of these known processes is that they use trifluoroacetic acid as the starting substance which is difficultly accessible. Finally, trifluoroacetyl chloride can also be obtained by light oxidation of 1,1,1-trifluoro-2,2-dichloroethane in the presence of chlorine (Journal of the Chemical Society London, 1959, 387).

Now, we have found that trifluoroacetyl chloride can be prepared in simple manner by subjecting fluoral (=trifluoroacetaldehyde) in the liquid phase to chlorination in the presence of light.

The process of the present invention can be carried out, for example, by introducing a stoichiometrical amount or an excess amount of gaseous chlorine into liquid fluoral, for example, 1 to 2 mols, preferably 1.0 to 1.1 mol, of chlorine per 1 mol of fluoral.

The hydrogen chloride formed during the reaction can be eliminated over a reflux cooler which is kept at such a low temperature that the other components of the reaction mixture completely condense out in the cooler. The reaction may also be carried out in the presence of a solvent which is inert under the reaction conditions, for example, carbon tetrachloride. The reaction already takes place at a temperature of —50° C. The upper temperature limit is set by the boiling point of the fluoral and of the trifluoroacetyl chloride formed. When the process is carried out under ordinary pressure, the reaction temperature is expediently kept at between about —60° C. and 0° C., preferably between about —35° C. and —25° C. When operating under pressure, the upper terperature limit rises in accordance with the pressure used. The final product can be recovered in good yields by fractional distillation of the reaction mixture.

The fluoral used as the starting substance can be easily prepared by reacting chloral with hydrogen fluoride on fluoration contacts.

The technical progress achieved by the process of the present invention consists in the fact that this process permits preparing trifluoroacetyl chloride in much simpler manner than the known processes. Trifluoroacetyl chloride, obtainable by the process of the present invention, constitutes a valuable intermediate product for further reactions and may be particularly used for the preparation of dyestuffs. The practicability of the process of the present invention was not foreseeable, since chloral, which is an analog to fluoral, under the same conditions undergoes decomposition into carbon tetrachloride, phosgene and hydrogen chloride according to the following equation:

$$Cl_3CCHO + 2Cl_2 \rightarrow CCl_4 + COCl_2 + HCl$$

(Bulletin de la Société Chimique de France (2), 45, 87 et Beilstein, 1, 616).

The following examples illustrate the invention but they are not intended to limit it thereto:

Example 1

123 parts by weight of chlorine were introduced in the course of about 3 hours at a temperature of —30° C. into 162 parts by weight of liquid fluoral with simultaneous exposure to the light of an ultraviolet lamp. Due to the dissolved chlorine, the fluoral first turned yellow green, but this coloration disappeared in the course of the reaction. 56 parts by weight of hydrogen chloride escaped through the reflux cooler which was cooled to about —60° C. The reaction was complete after about 3 hours. Fractional distillation gave 190 parts by weight of trifluoroacetyl chloride having a boiling point of —18° C. (corresponding to a yield of 87% of the theory).

Example 2

123 parts by weight of chlorine were introduced in the manner described in Example 1, at a temperature of —50° C., into 162 parts by weight of liquid fluoral with simultaneous exposure to the light of an ultraviolet lamp. Chlorination was complete when the chlorine consumption ceased, which became apparent by the continuation of the yellow green coloration of the reaction mixture and the termination of hydrogen chloride formation. By fractional distillation, there were obtained 170 parts by weight of trifluoroacetyl chloride.

Example 3

123 parts by weight of chlorine were introduced in the manner described in Example 1, at a temperature of —12° C., into 162 parts by weight of liquid fluoral with simultaneous exposure to the light of an ultraviolet lamp. Chlorination was complete when the chlorine consumption ceased, which became apparent by the continuation of the yellow green coloration of the reaction mixture and the termination of hydrogen chloride formation. By fractional distillation, there were obtained 192 parts by weight of trifluoroacetyl chloride.

We claim:
1. A process for preparing trifluoroacetyl chloride, which comprises reacting fluoral with chlorine in the liquid phase, at a temperature in the range of —60° C. and 0° C. and in the presence of ultraviolet light.
2. The process as claimed in claim 1, wherein the reaction is carried out at a temperature in the range of —35° C. and —25° C.

References Cited by the Examiner
UNITED STATES PATENTS 3,088,896   5/1963   Braid et al. _____ 204—158

OTHER REFERENCES

Chemical Abstract, 57 (1962) 12001(e).

JOHN H. MACK, Primary Examiner.
H. S. WILLIAMS, Assistant Examiner.